US012749879B2

(12) United States Patent
Ozgen et al.

(10) Patent No.: US 12,749,879 B2
(45) Date of Patent: Sep. 29, 2026

(54) UTILITY POLE WITH INTERNAL ELECTROMAGNETIC SHIELDING

(71) Applicant: ENERGY LIGHT LLC, Lake Zurich, IL (US)

(72) Inventors: Sami Ozgen, Barrington, IL (US); Mikhail Altman, Buffalo Grove, IL (US)

(73) Assignee: ENERGY LIGHT LLC, Lake Zurich, IL (US)

( * ) Notice: Subject to any disclaimer, the term of this patent is extended or adjusted under 35 U.S.C. 154(b) by 312 days.

(21) Appl. No.: 18/655,545

(22) Filed: May 6, 2024

(65) Prior Publication Data

US 2024/0380192 A1 Nov. 14, 2024

Related U.S. Application Data

(60) Provisional application No. 63/464,667, filed on May 8, 2023.

(51) Int. Cl.

| | |
|---|---|
| ***H05K 9/00*** | (2006.01) |
| ***H02G 1/08*** | (2006.01) |
| ***H02G 3/04*** | (2006.01) |

(52) U.S. Cl.

CPC ............. *H02G 3/0493* (2013.01); *H02G 1/08* (2013.01); *H02G 3/0406* (2013.01)

(58) Field of Classification Search

CPC ........................... H02G 3/0493; H05K 9/0081

See application file for complete search history.

(56) References Cited

U.S. PATENT DOCUMENTS

2015/0089901 A1* 4/2015 Chan ..................... E04H 12/003 52/848

2020/0157832 A1* 5/2020 Van Hoek-Patterson .................... E04B 1/943

* cited by examiner

*Primary Examiner* — Sherman Ng

(74) *Attorney, Agent, or Firm* — Fredrikson & Byron, P.A.

(57) ABSTRACT

A utility pole assembly includes a first pole shaft. The first pole shaft includes a first front wall, a first rear wall, and a first pair of side walls connecting the first front wall and the first rear wall that form a substantially square hollow first tube. The utility pole assembly also includes a second pole shaft. The second pole shaft includes a second front wall, a second rear wall, and a second pair of side walls connecting the second front wall and the second rear wall that form a substantially hollow square second tube. A mounting connector connects the first pole shaft and the second pole shaft. A shield assembly includes a first substantially planar shield and a second substantially planar shield. The first and second substantially planar shields are oriented substantially perpendicularly.

20 Claims, 6 Drawing Sheets

UTILITY POLE WITH INTERNAL ELECTROMAGNETIC SHIELDING

FIELD OF THE DISCLOSURE

This disclosure relates generally to a utility pole assembly, and more specifically to a utility pole having internal electromagnetic shielding.

BACKGROUND

Utility poles, such as light poles and power poles, come in many shapes and sizes. Many utility poles are made of metal, cement, or other rigid and durable material, and have a hollow core. The hollow core reduces the weight of the utility pole. Recently, with the explosion of wireless communication and the need for antennas to cover more geographical area, utility poles have started to be used in a secondary role, which is to support an antenna or other communication equipment. While initially hardware, such as wires and support brackets, was attached to the outside of the utility pole, more recently the hollow interior of the utility pole is being used for at least some hardware. For example, when the antenna is located on an upper portion of the utility pole, wires may run down the hollow interior of the utility pole to other connection or communication devices near or beneath the ground so that the antenna is connected to a network. The hollow interior of the utility pole is ideal because of the otherwise unused space and providing at least some protection from environmental conditions.

As the need for antennas and other communication equipment grows, towers often are used to support multiple communication devices, each having their own connections (e.g., wires) to a network. For example, if a utility pole is positioned in a desirable location, for example at or near the top of a hill or peak, such that functionality of the communication equipment is enhanced (such as increasing antenna coverage), multiple services may want to place equipment on a single utility pole. While utility poles can often physically support many communication devices, many wires running down the hollow center of the utility pole can cause other problems.

There is a need for a utility pole that can support multiple wired connections for multiple communication devices.

SUMMARY

In a first example, a utility pole assembly includes a first pole shaft. The first pole shaft includes a first front wall, a first rear wall, and a first pair of side walls connecting the first front wall and the first rear wall. The first front wall, the first rear wall, and the first pair of sidewalls form a substantially square hollow first tube. The utility pole assembly also includes a second pole shaft. The second pole shaft includes a second front wall, a second rear wall, and a second pair of side walls connecting the second front wall and the second rear wall. The second front wall, the second rear wall, and the second pair of sidewalls form a substantially hollow square second tube. A mounting connector connects the first pole shaft and the second pole shaft. The mounting connector includes a connecting front wall, a connecting rear wall, and a connecting pair of side walls. The connecting front wall, the connecting rear wall, and the connecting pair of side walls form a substantially hollow square mounting connector. A shield assembly is disposed within one of the first pole shaft and the second pole shaft. The shield assembly includes a first substantially planar shield and a second substantially planar shield. The first and second substantially planar shields are oriented substantially perpendicularly to one another.

The above example of a utility pole assembly may further include any one or more of the following optional forms.

In one optional form, the first substantially planar shield is oriented diagonally within the first pole shaft.

In another optional form, the second substantially planar shield is oriented diagonally within the first pole shaft.

In yet another optional form, the shield assembly divides a hollow interior of the first pole shaft into four compartments.

In yet another optional form, a first wire is disposed in a first compartment and a second wire disposed in a second compartment, and electromagnetic radiation emitted from electrical current flowing through the first wire is blocked or absorbed by the shield assembly so that the electromagnetic radiation emitted by the first wire does not interfere with electromagnetic signals traveling through the second wire.

In yet another optional form, the shield assembly comprises a material having electromagnetic shielding properties.

In yet another optional form, the first substantially planar shield comprises a first notch.

In yet another optional form, the first notch is oriented along a longitudinal axis of the first substantially planar shield, and the first notch begins at one end of the first substantially planar shield and continues approximately one half of the length of the first substantially planar shield, the first notch terminating at approximately a middle of the first substantially planar shield, both longitudinally and laterally.

In yet another optional form, the second substantially planar shield assembly comprises a second notch.

In yet another optional form, the second notch is oriented along a longitudinal axis of the second substantially planar shield, and the second notch begins at one end of the second substantially planar shield and continues approximately one half of the length of the second substantially planar shield, the second notch terminating at approximately a middle of the second substantially planar shield, both longitudinally and laterally.

In yet another optional form, the mounting connector further comprises an exterior ledge extending outward from an outer surface of the mounting connector.

In yet another optional form, the ledge is positioned approximately halfway between a first end of the mounting connector and a second end of the mounting connector.

In yet another optional form, the mounting connector includes at least one opening in an exterior wall thereof and the first pole shaft includes at least one opening in an exterior wall thereof, and the at least one opening in the exterior wall of the mounting connector is aligned with the at least one opening in the exterior wall of the first pole shaft when the mounting connector is inserted into the first pole shaft.

In yet another optional form, a fastener extends through the at least one opening in the exterior wall of the mounting connector and through the at least one opening in the exterior wall of the first pole shaft.

In yet another optional form, the mounting connector further comprises an internal shelf.

In yet another optional form, the internal shelf includes a shelf opening.

In yet another optional form, the shelf opening is circular.

In another example, a utility pole assembly includes a first pole shaft. The first pole shaft includes a substantially hollow first tube. The utility pole assembly also includes a second pole shaft. The second pole shaft includes a substantially hollow second tube. A mounting connector joins the first pole shaft and the second pole shaft. A shield assembly is disposed within the first pole shaft. The shield assembly includes a first shield and a second shield. The first and second shields cooperate with one another to form a plurality of internal conduits within the first pole shaft.

The above utility pole assembly may further include one or more of the following optional forms.

In one optional form, the first pole shaft has a circular cross-sectional shape.

In another optional form, the first pole shaft has a polygonal cross-sectional shape.

In yet another optional form, the first shield is a curved plate.

In yet another optional form, the second shield is a curved plate.

In another example, a method for assembling a utility pole assembly includes providing, a utility pole assembly includes a first pole shaft. The first pole shaft includes a first front wall, a first rear wall, and a first pair of side walls connecting the first front wall and the first rear wall. The first front wall, the first rear wall, and the first pair of sidewalls form a substantially square hollow first tube. The utility pole assembly also includes a second pole shaft. The second pole shaft includes a second front wall, a second rear wall, and a second pair of side walls connecting the second front wall and the second rear wall. The second front wall, the second rear wall, and the second pair of sidewalls form a substantially hollow square second tube. A mounting connector connects the first pole shaft and the second pole shaft. The mounting connector includes a connecting front wall, a connecting rear wall, and a connecting pair of side walls. The connecting front wall, the connecting rear wall, and the connecting pair of side walls form a substantially hollow square mounting connector. A shield assembly includes a first substantially planar shield and a second substantially planar shield. The first and second substantially planar shields are oriented substantially perpendicularly to one another. The shield assembly is inserted into one of the first pole shaft and the second pole shaft to form a plurality of internal conduits.

The above method of assembling a utility pole may further include one or more of the following optional forms.

In one optional form, a first wire is inserted into a first one of the plurality of internal conduits.

In another optional form, a second wire is inserted into a second one of the plurality of internal conduits.

DETAILED DESCRIPTION

Figure 1:
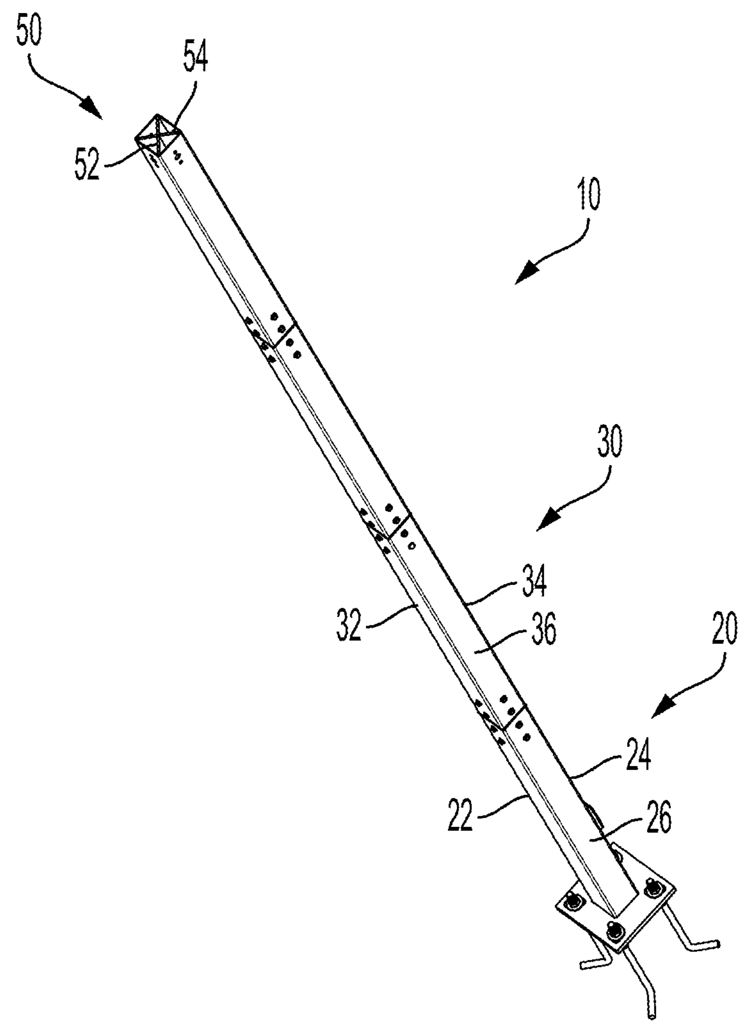
FIG. 1 is a perspective view of a utility pole assembly constructed in accordance with the teachings of the disclosure.
Figure 2:
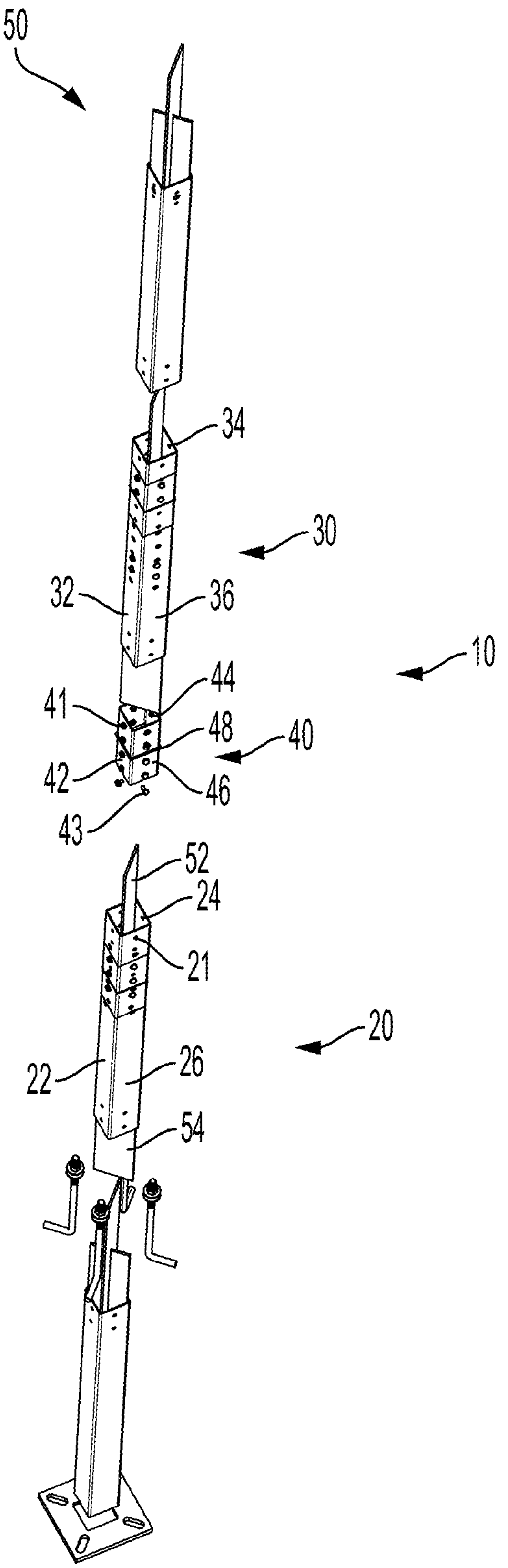
FIG. 2 is a partially exploded perspective view of the utility pole assembly of FIG. 1.

Turning now to the figures, specifically FIGS. 1-4, a utility pole assembly 10 includes a first pole shaft 20 and a second pole shaft 30. The first pole shaft 20 includes a first front wall 22, a first rear wall 24, and a first pair of side walls 26 connecting the first front wall 22 and the first rear wall 24. The first front wall 22, the first rear wall 24, and the first pair of sidewalls 26 form a substantially square hollow first tube 28.

The second pole shaft 30 includes a second front wall 32, a second rear wall 34, and a second pair of side walls 36 connecting the second front wall 32 and the second rear wall 34. The second front wall 32, the second rear wall 34, and the second pair of sidewalls 36 form a substantially hollow square second tube 38.

A mounting connector 40 connects the first pole shaft 20 and the second pole shaft 30. The mounting connector 40 includes a connecting front wall 42, a connecting rear wall 44, and a connecting pair of side walls 46. The connecting front wall 42, the connecting rear wall 44, and the connecting pair of side walls 46 form a substantially hollow square mounting connector 48.

A shield assembly 50 is disposed within one of the first pole shaft 20 and the second pole shaft 30. The shield assembly 50 includes a first substantially planar shield 52 and a second substantially planar shield 54. The first and second substantially planar shields 52, 54 are oriented substantially perpendicularly to one another.

Although the first pole shaft 20, the second pole shaft 30, and the mounting connector 40 are illustrated in FIGS. 1-4 as having substantially square cross-sectional shapes, in other embodiments, the first pole shaft 20, the second pole shaft 30, and/or the mounting connector 40 may have other cross-sectional shapes, including, but not limited to, circular, oval, hexagonal, octagonal, and polygonal.

Although the first substantially planar shield 52 and the second substantially planar shield 54 are illustrated as planar bodies, in other embodiments, the first shield and/or the second shield may have other shapes, such as a curved shape.

The first substantially planar shield 52 is oriented diagonally within the first pole shaft 20. In other words, the first substantially planar shield 52 is oriented to extend from a first corner 62 of the first pole shaft 20 to a second opposite corner 64 of the first pole shaft 20. Similarly, the second substantially planar shield 54 is oriented diagonally within the first pole shaft 20. In other words, the second substantially planar shield 54 is oriented to extend from a third corner 66 to a fourth opposite corner 68 of the first pole shaft.

While the shield assembly 50 is discussed herein as being disposed in the first pole shaft 20, the shield assembly 50 may be disposed in the second pole shaft 30 and/or other pole shafts. In some embodiments, multiple shield assemblies 50 may be disposed in the utility pole assembly 10. Discussions of other shield assemblies 50 in other pole shafts will not be included for the sake of brevity. However, those of ordinary skill in the art will understand that the discussion of the shield assembly 50 being disposed in the first pole shaft 20 applies equally, and may be transferred to, other pole shafts in the utility pole assembly 10.

Figure 3:
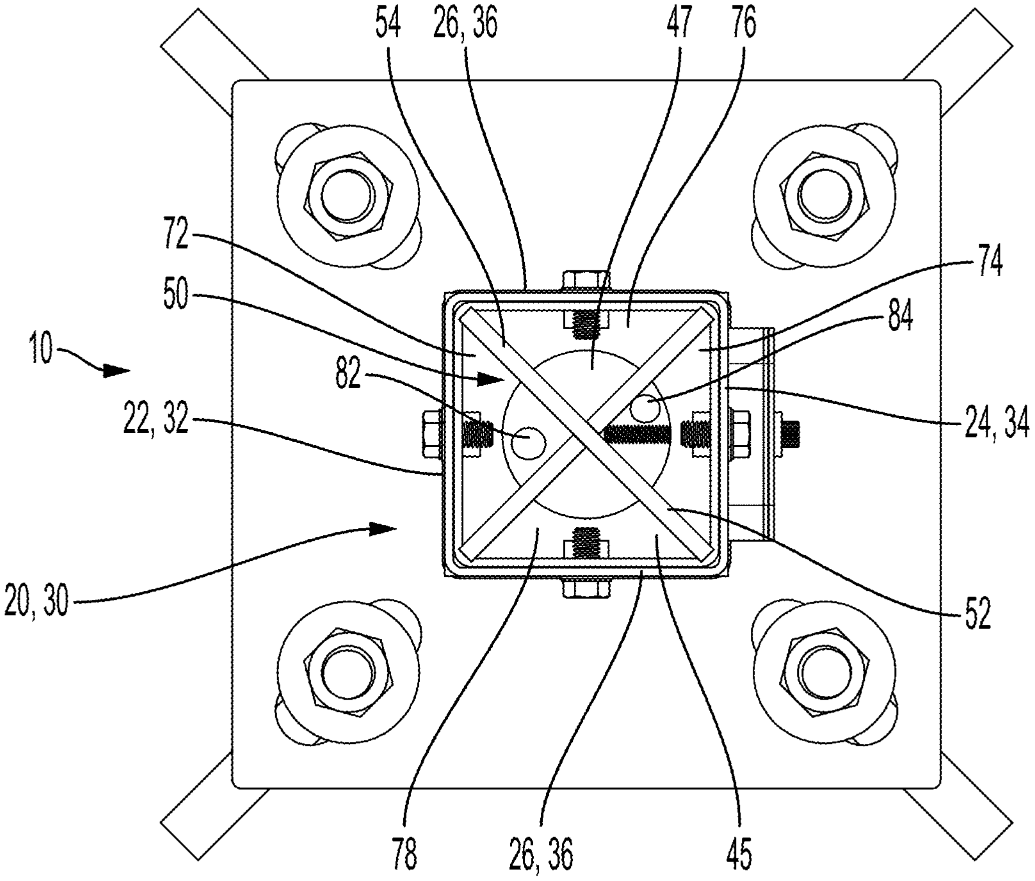
FIG. 3 is a top view of the utility pole assembly of FIG. 1.
Figure 4:
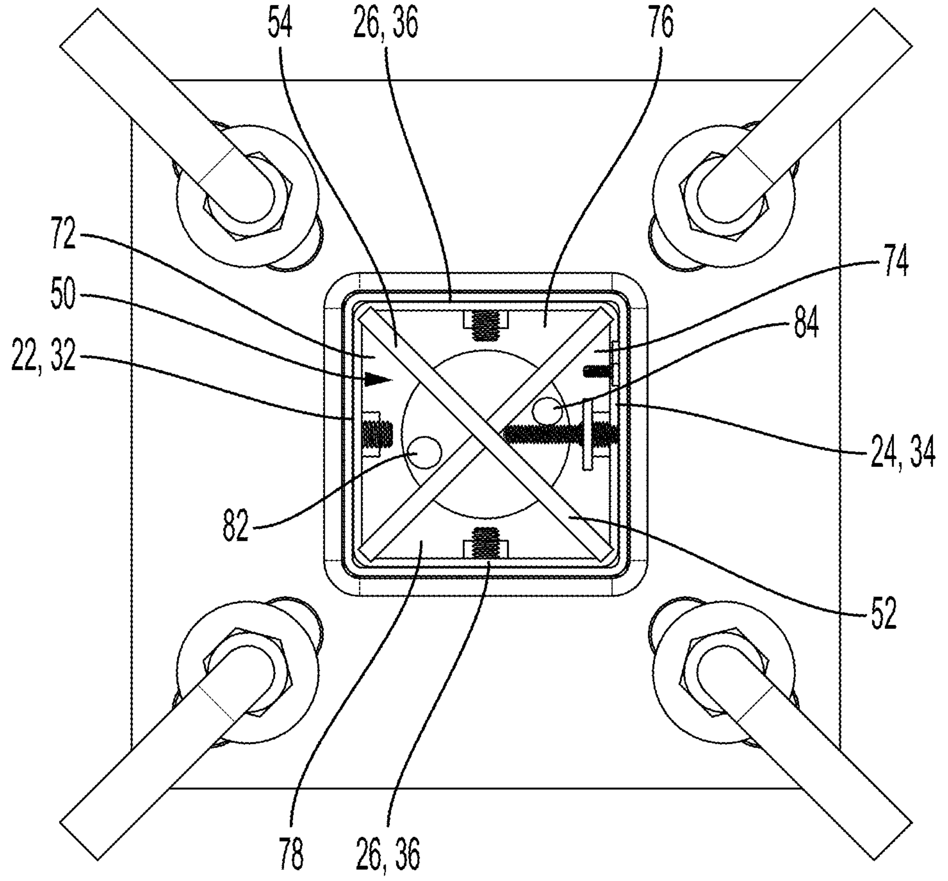
FIG. 4 is a bottom view of the utility pole assembly of FIG. 1.

The shield assembly 50 divides a hollow interior of the first pole shaft 20 into four compartments 72, 74, 76, 78, as illustrated in FIGS. 3 and 4. In other embodiments, more or less compartments may be formed by the shield assembly.

A first wire 82 is disposed in a first compartment 72 and a second wire 84 is disposed in a second compartment 74. The first wire 82 and the second wire 84 may connect equipment located at an upper portion of the utility pole assembly 10 with networking or other communication equipment located at a lower portion of the utility pole assembly 10, or in the ground beneath the utility pole assembly 10. Electromagnetic radiation emitted from electrical current flowing through the first wire 82 is at least partially blocked or absorbed by the shield assembly 50 so that interference between the electromagnetic radiation emitted by the first wire 82 and the electromagnetic signals traveling through the second wire 84 is reduced or eliminated, and vice versa.

Figure 5:
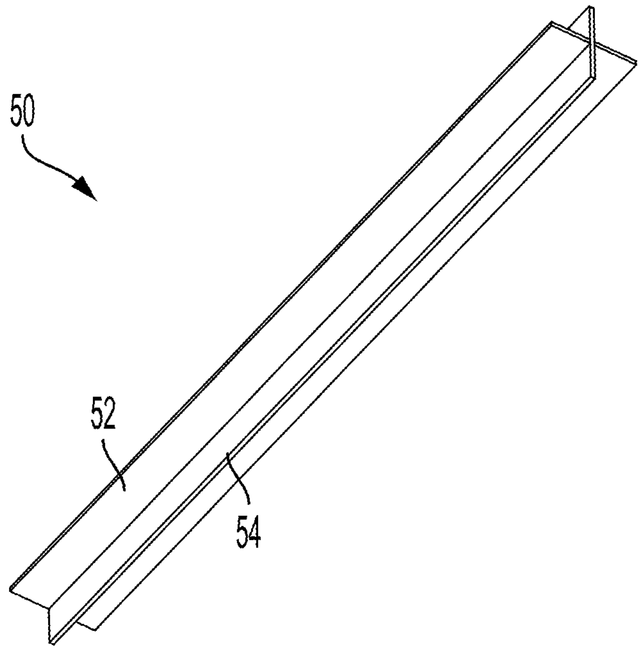
FIG. 5 is a perspective view of a shield assembly of the utility pole assembly of FIG. 1.
Figure 6:
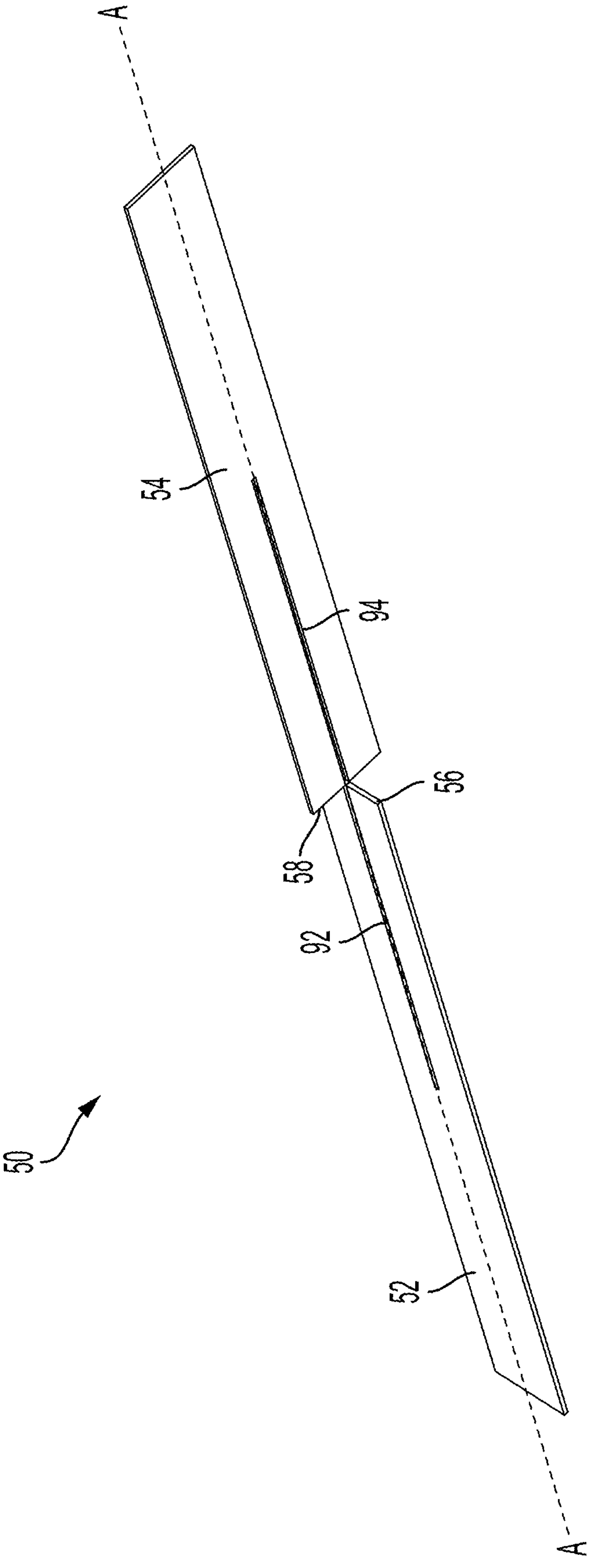
FIG. 6 is a partially exploded perspective view of the shield assembly of FIG. 5.

Turning now to FIGS. 5 and 6, the first substantially planar shield 52 comprises a first notch 92. The first notch 92 is oriented along a longitudinal axis A of the first substantially planar shield 52. The first notch begins a first end 56 of the first substantially planar shield 52 and continues approximately one half of the length of the first substantially planar shield 52. The first notch 92 terminates at approximately a middle of the first substantially planar shield 52, both longitudinally and laterally.

Similarly, the second substantially planar shield 54 assembly comprises a second notch 94. The second notch 94 is oriented along a longitudinal axis A of the second substantially planar shield 54. The second notch 94 begins a first end 58 of the second substantially planar shield 54 and continues approximately one half of the length of the second substantially planar shield 54. The second notch 94 terminates at approximately a middle of the second substantially planar shield 54, both longitudinally and laterally.

Returning now to FIG. 2, the mounting connector 40 further comprises an exterior ledge 48 extending outward from an outer surface of the mounting connector 40. The ledge 48 is positioned approximately halfway between a first end of the mounting connector 40 and a second end of the mounting connector 40.

The mounting connector 40 includes at least one opening 41 in an exterior wall thereof and the first pole shaft 20 includes at least one opening 21 in an exterior wall thereof. The at least one opening 41 in the exterior wall of the mounting connector 40 is aligned with the at least one opening 21 in the exterior wall of the first pole shaft 20 when the mounting connector 40 is inserted into the first pole shaft 20. A fastener 43 extends through the at least one opening 41 in the exterior wall of the mounting connector 40 and through the at least one opening 21 in the exterior wall of the first pole shaft 20.

Turning now again to FIGS. 3 and 4, the mounting connector 40 further comprises an internal shelf 45. The internal shelf 45 includes a circular shelf opening 47. In other embodiments, the opening may have other shapes.

The utility pole assembly 10 described herein is modular in the sense that any number of pole shafts may be provided along with any number of mounting connectors and shield assemblies. The shield assemblies may be inserted into one of the first pole shafts after or during assembly of the pole shafts to form a plurality of internal conduits within the individual pole shafts.

Once assembled, a first wire may be inserted into a first one of the plurality of internal conduits, and a second wire may inserted into a second one of the plurality of internal conduits. The shield assembly blocks electromagnetic radiation emitting from one wire from interfering with electromagnetic signals traveling in the other wire. In this way, the disclosed utility pole assemblies and shield assemblies enhance signal transmission through wires located within utility pole sections.

The utility pole assemblies described herein having a shield assembly advantageously prevent electromagnetic interference from one wire from interfering with electromagnetic signals traveling in the other wire. The electromagnetic shield assembly may comprise materials having electromagnetic shielding properties. In some examples, the electromagnetic shield assembly may comprise one or more of metals, carbons, ceramics, composites, cements, or similar materials, or combinations thereof.

While various embodiments have been described herein, it will be understood that modifications may be made thereto that are still considered within the scope of the appended claims.

What is claimed is:

1. A utility pole assembly comprising:

a first pole shaft, the first pole shaft including a first front wall, a first rear wall, and a first pair of side walls connecting the first front wall and the first rear wall, the first front wall, the first rear wall, and the first pair of sidewalls forming a substantially square hollow first tube;

a second pole shaft, the second pole shaft including a second front wall, a second rear wall, and a second pair of side walls connecting the second front wall and the second rear wall, the second front wall, the second rear wall, and the second pair of sidewalls forming a substantially hollow square second tube;

a mounting connector including a connecting front wall, a connecting rear wall, and a connecting pair of side walls, the connecting front wall, the connecting rear wall, and the connecting pair of side walls forming a substantially hollow square mounting connector; and a shield assembly disposed within one of the first pole shaft and the second pole shaft, the shield assembly comprising a first substantially planar shield and a second substantially planar shield, the first and second substantially planar shields being oriented substantially perpendicularly to one another.

2. The utility pole assembly of claim 1, wherein the first substantially planar shield is oriented diagonally within the first pole shaft.

3. The utility pole assembly of claim 1, wherein the second substantially planar shield is oriented diagonally within the first pole shaft.

4. The utility pole assembly of claim 1, wherein the shield assembly divides a hollow interior of the first pole shaft into four compartments.

5. The utility pole assembly of claim 4, further comprising a first wire disposed in a first compartment and a second wire disposed in a second compartment, wherein electromagnetic radiation emitted from electrical current flowing through the first wire is blocked or absorbed by the shield assembly so that the electromagnetic radiation emitted by the first wire does not interfere with electromagnetic signals traveling through the second wire.

6. The utility pole assembly of claim 1, wherein the shield assembly comprises a material having electromagnetic shielding properties.

7. The utility pole assembly of claim 1, wherein the first substantially planar shield comprises a first notch.

8. The utility pole assembly of claim 7, wherein the first notch is oriented along a longitudinal axis of the first substantially planar shield, and the first notch begins at one end of the first substantially planar shield and continues approximately one half of the length of the first substantially planar shield, the first notch terminating at approximately a middle of the first substantially planar shield, both longitudinally and laterally.

9. The utility pole assembly of claim 1, wherein the second substantially planar shield assembly comprises a second notch.

10. The utility pole assembly of claim 9, wherein the second notch is oriented along a longitudinal axis of the second substantially planar shield, and the second notch begins at one end of the second substantially planar shield and continues approximately one half of the length of the second substantially planar shield, the second notch terminating at approximately a middle of the second substantially planar shield, both longitudinally and laterally.

11. The utility pole assembly of claim 1, wherein the mounting connector includes at least one opening in an exterior wall thereof and the first pole shaft includes at least one opening in an exterior wall thereof, and the at least one opening in the exterior wall of the mounting connector is aligned with the at least one opening in the exterior wall of the first pole shaft when the mounting connector is inserted into the first pole shaft.

12. The utility pole assembly of claim 1, wherein the mounting connector further comprises an internal shelf.

13. The utility pole assembly of claim 12, wherein the internal shelf includes a shelf opening.

14. The utility pole assembly of claim 13, wherein the shelf opening is circular.

15. A utility pole assembly comprising:

a first pole shaft, the first pole shaft comprising a substantially hollow first tube;

a second pole shaft, the second pole shaft comprising a substantially hollow second tube;

a mounting connector; and a shield assembly disposed within the first pole shaft, the shield assembly comprising a first shield and a second shield, the first and second shields cooperating with one another to form a plurality of internal conduits within the first pole shaft.

16. The utility pole assembly of claim 15, wherein the first pole shaft has a circular cross-sectional shape.

17. The utility pole assembly of claim 15, wherein the first pole shaft has a polygonal cross-sectional shape.

18. A method for assembling a utility pole assembly, the method comprising: providing, a first pole shaft, the first pole shaft including a first front wall, a first rear wall, and a first pair of side walls connecting the first front wall and the first rear wall, the first front wall, the first rear wall, and the first pair of sidewalls forming a substantially square hollow first tube;

a second pole shaft, the second pole shaft including a second front wall, a second rear wall, and a second pair of side walls connecting the second front wall and the second rear wall, the second front wall, the second rear wall, and the second pair of sidewalls forming a substantially hollow square second tube;

a mounting connector including a connecting front wall, a connecting rear wall, and a connecting pair of side walls, the connecting front wall, the connecting rear wall, and the connecting pair of side walls forming a substantially hollow square mounting connector; and a shield assembly, the shield assembly comprising a first substantially planar shield and a second substantially planar shield, the first and second substantially planar shields being oriented substantially perpendicularly to one another; and inserting the shield assembly into one of the first pole shaft and the second pole shaft to form a plurality of internal conduits.

19. The method of claim 18, further comprising inserting a first wire into a first one of the plurality of internal conduits.

20. The method of claim 18, further comprising inserting a second wire into a second one of the plurality of internal conduits.

* * * * *